UNITED STATES PATENT OFFICE.

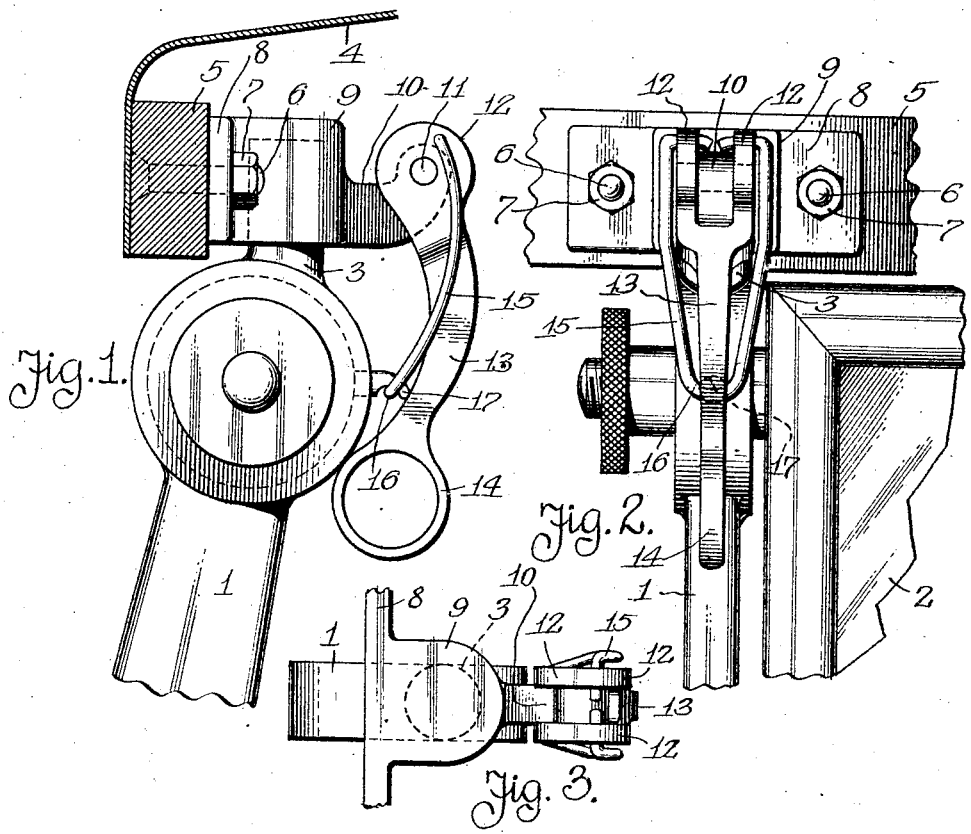

IRVING T. GILLIAN AND COLONEL E. COOLMAN, OF DETROIT, MICHIGAN.

WINDSHIELD-TOP FASTENER.

1,404,596.  Specification of Letters Patent.  Patented Jan. 24, 1922.

Application filed August 18, 1919. Serial No. 318,275.

*To all whom it may concern:*

Be it known that we, IRVING T. GILLIAN and COLONEL E. COOLMAN, citizens of the United States of America, residing at Detroit, in the county of Wayne and State of Michigan, have invented certain new and useful Improvements in Windshield-Top Fasteners, of which the following is a specification, reference being had therein to the accompanying drawings.

This invention relates to a windshield fastener and has special reference to that class of fasteners adapted for connecting the forward end of an automobile top to the windshield of an automobile, so that the windshield may cooperate with bows and an automobile body in supporting a top in a raised and extended position. It is the present practice to use straps, pin and socket connections, and other devices for this purpose, but due to rough riding or vibrations of an automobile body of the fasteners become loose, rattle, and more or less cause considerable trouble.

Our invention aims to provide a windshield and top connection embodying positive and reliable means, in a manner as hereinafter set forth, for expeditiously connecting the forward end of an automobile top to a windshield so that the former will be positively held relative to the latter against rattling or accidental displacement.

Our invention further aims to provide a fastener of the above type wherein a toggle or leverage principle is involved which permits of a positive clamping effect being attained for anchoring the forward end of an automobile top, canopy or cover relative to the upper end of the windshield, frame or other support carried by an automobile or other vehicle.

Our invention still further aims to provide a windshield fastener wherein the parts are constructed with a view of reducing the cost of manufacture and at the same time retain those features by which safety, durability and ease of assembling are secured. With such ends in view our invention resides in the novel construction to be hereinafter considered and then claimed.

Reference will now be had to the drawing, wherein—

Figure 1 is a side elevation of the fastener showing the same as connecting the forward end of an automobile top to a windshield;

Fig. 2 is a front elevation of the same, and

Fig. 3 is a plan of the fastener.

In describing our invention by aid of the views above referred to, it is to be understood that the same are intended as merely illustrative of the fastener as now constructed, and we do not care to confine our invention to the precise construction and arrangement of parts other than defined by the appended claims. It is also to be understood that while we have herein shown a single fastener that two or more are used in connection with an automobile top.

In the drawing, the reference numeral 1 denotes a support or side frame adapted for holding a windshield frame 2, and on the upper end of the support 1 is a stud or pin 3.

4 denotes a portion of an automobile top having a front rail or bow 5 and connected thereto by screw bolts 6, nuts 7 or other fastening means are the side wings 8 of a socket 9 adapted to receive the stud or pin 3.

10 denotes an arm carried by the front side of the socket 9 and pivotally connected to said arm by a pin 11 is the upper bifurcated or forked end 12 of a curved lever 13, said lever having the lower end thereof provided with a finger piece or grip 14.

15 denotes a bail or link having its upper ends pivotally mounted in the bifurcated or forked end 12 of the lever 13 so that said bail may freely swing during adjustment by the lever 13, said lever extending through the bail with the lower loop end 16 of the bail at the front side of said lever, and with the ends of the bail extending above the pivot of the lever and eccentrically disposed relative thereto. Thus the bail may be raised and lowered by swinging the lever 13 on its pivot.

17 denotes a hook shaped lug or keeper carried by the front side of the support 1 and under which the loop end 16 of the bail 15 is adapted to engage and hold the socket 9 on the stud or pin 3.

With the lever 13 raised, and the pivoted ends of the bail 15 below or in proximity to the plane of the pivot pin 11 of the lever 13, the bail 15 can be swung into engagement with the keeper 17 and then as the lever 13 is swung downwardly towards the support 1, the pivoted ends of the bail are carried upwardly above the pivot pin 11 so that the bail 15 will be tightened. By closing the lever 13 against the support 1, as shown in Fig. 1, the pivoted ends of the bail 15 are carried to one side of the vertical plane of the pin 11, consequently there is no dead center and the bail 15 will be sufficiently sprung so that its resiliency will tend to hold the lever 13 in a closed position. It is this toggle or leverage effect that produces the clamping action of the socket 9 on the stud or pin 3, and it is practically impossible for any vibration of the fastener to loosen the lever 13 to such an extent that it will swing to an open position and release the bail 15. The lever 13 may be easily and quickly pulled outwardly and swung upwardly to release the bail 15 and with one of these fasteners at each support of the windshield frame 2, the front end of the automobile top 4 is positively anchored relative to the windshield.

What we claim is:—

1. A fastener comprising a support having a vertical stud and a keeper adjacent said stud, a socket adapted to fit down over the stud of said support, a lever having its upper end pivotally held by said socket and its lower end adapted to engage said support below said keeper and adapted to hold said socket relative to said support, and a resilient bail carried by said lever adapted to engage under the support keeper and having a toggle action at the front side of said support.

2. A fastener as characterized in claim 1 wherein said lever is supported to swing in a vertical plane and said bail is bowed and connected to said lever and adapted to be sprung to produce a clamping action between said stud and socket.

3. A fastener comprising a support having a vertical stud and a keeper, a socket adapted to fit down over the stud on said support, a bail having one end adapted to engage under the keeper of said support, and a lever extending through said bail and having its upper end pivotally supported by said socket and pivotally connected to said bail with its lower end adapted to contact with said support, said lever and bail having a relation which causes said lever to flex said bail to effect a clamping action of said socket on the stud of said support.

In testimony whereof we affix our signatures in presence of two witnesses.

IRVING T. GILLIAN.
COLONEL E. COOLMAN.

Witnesses:
KARL H. BUTLER,
ANNA M. DORR.